(12) United States Patent  
Krenek et al.

(10) Patent No.: US 10,479,255 B2
(45) Date of Patent: Nov. 19, 2019

(54) AGGREGATE DELIVERY UNITY

(71) Applicant: SCHLUMBERGER TECHNOLOGY CORPORATION, Sugar Land, TX (US)

(72) Inventors: David Krenek, Katy, TX (US); Kevin W. England, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 304 days.

(21) Appl. No.: 14/328,435

(22) Filed: Jul. 10, 2014

(65) Prior Publication Data
US 2014/0321950 A1 Oct. 30, 2014

Related U.S. Application Data

(62) Division of application No. 12/212,698, filed on Sep. 18, 2008, now abandoned.

(60) Provisional application No. 60/974,268, filed on Sep. 21, 2007.

(51) Int. Cl.
*E21B 43/267* (2006.01)
*B60P 1/64* (2006.01)
*B65D 88/12* (2006.01)

(52) U.S. Cl.
CPC ........... *B60P 1/6418* (2013.01); *B65D 88/12* (2013.01); *E21B 43/267* (2013.01)

(58) Field of Classification Search
CPC ........ E21B 44/00; E21B 43/25; E21B 43/267; B60P 1/6418; B65D 88/12; B65D 88/30; B65D 88/544; B65G 43/08; B65G 65/32; G05D 11/134; G01G 11/04; G01G 19/08; Y10T 137/86372

See application file for complete search history.

(56) References Cited

U.S. PATENT DOCUMENTS

| | | |
|---|---|---|
| 2,423,879 A | 7/1947 | De Frees |
| 3,868,149 A * | 2/1975 | Weaver ............... B65G 65/32 |
| | | 406/160 |
| 4,265,266 A | 5/1981 | Kierbow et al. |
| 4,701,095 A | 10/1987 | Berryman et al. |
| 4,801,389 A | 1/1989 | Brannon et al. |
| 4,954,975 A | 9/1990 | Kalata |
| 5,413,154 A | 5/1995 | Hurst, Jr. et al. |

(Continued)

OTHER PUBLICATIONS

Office Action issued in Canadian Application No. 2,639,661 dated Jan. 19, 2016; 5 pages.

(Continued)

*Primary Examiner* — Daniel P Stephenson

(57) ABSTRACT

A delivery unit for providing aggregate to a worksite, such as a wellsite location. The unit may include a mobile chassis for accommodating a plurality of modular containers which in turn house the aggregate. As such, a weight measurement device may be located between each container and the chassis so as to monitor aggregate levels within each container over time. The units may be particularly well suited for monitoring and controlling aggregate delivery during a fracturing operation at an oilfield. The modular containers may be of an interchangeable nature. Furthermore, a preferably wireless control device may be provided for monitoring and directing aggregate delivery from a relatively remote location.

16 Claims, 7 Drawing Sheets

(56) References Cited

U.S. PATENT DOCUMENTS

| | | | |
|---|---|---|---|
| 5,570,743 | A | 11/1996 | Padgett et al. |
| 5,590,976 | A | 1/1997 | Kilheffer et al. |
| 6,002,063 | A | 12/1999 | Bilak et al. |
| 6,069,118 | A | 5/2000 | Hinkel et al. |
| 6,192,985 | B1 | 2/2001 | Hinkel et al. |
| 6,283,212 | B1 | 9/2001 | Hinkel et al. |
| 6,306,800 | B1 | 10/2001 | Samuel et al. |
| 6,660,693 | B2 | 12/2003 | Miller et al. |
| 6,720,290 | B2 | 4/2004 | England et al. |
| 6,776,235 | B1 | 8/2004 | England |
| 6,828,280 | B2 | 12/2004 | England et al. |
| 6,915,854 | B2 | 7/2005 | England et al. |
| 7,084,095 | B2 | 8/2006 | Lee et al. |
| 2004/0245284 | A1 | 12/2004 | Mehus et al. |
| 2007/0125543 | A1 | 6/2007 | McNeel et al. |
| 2008/0008562 | A1 | 1/2008 | Beckel et al. |
| 2008/0264641 | A1 | 10/2008 | Slabaugh et al. |
| 2010/0038143 | A1 | 2/2010 | Burnett et al. |

OTHER PUBLICATIONS

Office Action issued in Canadian Application No. 2,973,997 dated Aug. 30, 2018; 4 pages.

\* cited by examiner

AGGREGATE DELIVERY UNITY

CROSS REFERENCE TO RELATED APPLICATION(S)

This application is a divisional application of U.S. patent application Ser. No. 12/212,698 filed Sep. 18, 2008, which claims priority to U.S. Provisional Application Ser. No. 60/974,268, entitled "Product Storage and Delivery Assembly," filed on Sep. 21, 2007, which is incorporated by reference herein in its entirety.

BACKGROUND

The statements in this section merely provide background information related to the present disclosure and may not constitute prior art.

Embodiments described relate to aggregate delivery units. In particular, embodiments employing modular configurations of containers for housing aggregate are described. The containers may be well suited for housing aggregate in the form of proppant or other materials for use in oilfield operations.

BACKGROUND OF THE RELATED ART

The statements in this section merely provide background information related to the present disclosure and may not constitute prior art.

Exploring, drilling and completing hydrocarbon and other wells are generally complicated, time consuming and ultimately very expensive endeavors. As a result, over the years, well architecture has become more sophisticated where appropriate in order to help enhance access to underground hydrocarbon reserves. For example, as opposed to wells of limited depth, it is not uncommon to find hydrocarbon wells exceeding 30,000 feet in depth. Furthermore, today's hydrocarbon wells often include deviated or horizontal sections aimed at targeting particular underground reserves. Indeed, at targeted formation locations, it is quite common for a host of lateral legs and fractures to stem from the main wellbore of the well toward a hydrocarbon reservoir in the formation.

The above described fractures may be formed by a fracturing or hydraulic fracturing operation, often referred to as a stimulation operation. The stimulation or fracturing operation, involves pumping of a fracturing fluid at a pressure above that which is required to hydraulically fracture the reservoir rock into the well in order to form the fractures and stimulate production of the hydrocarbons. The formed fractures may then serve as channels through the formation through which hydrocarbons may reach the wellbore. The indicated fracturing fluid generally includes a solid particulate referred to as proppant, often sand. The proppant may act to enhance the flow capacity (typically referred to as the fracture conductivity) of the fractures during the fracturing operation and also remain primarily within fractures upon their formation and after the end of the hydraulic fracturing treatment. In fact, the fractures may remain open in part or primarily due to their propping open by the proppant.

The above described proppant for the fracturing operation may be supplied from a proppant delivery unit located at the oilfield near the well. This unit is generally very large due to the amount of proppant that may be required for any given fracturing operation and, when loaded may be extremely heavy in weight. Thus, as a matter of practicality, the unit is provided to the wellsite location in a mobile but usually empty manner and then subsequently filled with a proppant of choice for the fracturing operation. In this manner, all of the proppant for the operation may be provided from a single controlled supply.

The above described proppant delivery unit includes separate compartments for housing potentially varying types of proppant or other additives for the operation. The compartments each include a hopper and valve assembly at the bottom thereof which may be individually controlled for emptying onto a conveyor belt leading to a mixer directed at the well. While it is advantageous to have all of the proppant delivered from a single unit with a single set of valves, this leads to the massive size of the unit as noted. For example, in addition to the massive weight as indicated, the compartmentalized housing of the unit alone may include over 1,900 feet of welding. Thus, a tremendous amount of labor and space are required during manufacturing.

In addition, due to its large unitary configuration, there is no practical manner to monitor the reducing weight or volume of the different proppant compartments in an automated manner during an operation. Furthermore, if proppant becomes unexpectedly depleted leaving the mixer empty, the entire operation may require shutting down. Thus, in order to prevent this circumstance, manual inspection is regularly employed to dynamically gauge the level of proppant within the various compartments of the delivery unit. That is, it is not uncommon during a fracturing operation to see an operator climbing to the top of the unit to visually inspect compartment levels.

In addition, reliance on visual inspection of the delivery unit results in a very imprecise monitoring of aggregate materials being employed for the fracturing operation. This imprecision is also found in the manner in which the operator directs emptying of the compartments onto the conveyor belt below the unit. Namely, the operator is generally provided with a control platform positioned at the rear of the unit where manual levers are located. These levers are preferably hydraulically linked to the valves below each compartment of the unit. In this manner, the operator is able to move a lever and then visually attempt to monitor the corresponding effect in proppant delivery at the conveyor belt. Not only is this a very imprecise manner of monitoring the delivery mix, it also remains invisible to the operator until the delivery mix reaches the vicinity of the operator at the rear of the unit.

Overall, the operator is left with a proppant delivery unit that is massive, immobile, and requires a significant amount of space and unskilled man-hours to manufacture. Furthermore, due to the configuration of the unit, the precision of the operation itself are both placed at risk.

SUMMARY

In an embodiment, an aggregate delivery unit comprises a modular container for housing aggregate, a mobile chassis for accommodating the modular container, and at least one weight measuring device disposed between the mobile chassis and the modular container. Alternatively, the aggregate delivery unit further comprises a cradle having a frame to accommodate the modular container thereon and coupled to the at least one weight measurement device therebelow. The at least one weight measurement device may be a plurality of load cells about the frame of the cradle, the plurality to provide weight measurement data for averaging. The cradle may further comprise a valve gate for controllably releasing aggregate within the modular container through an opening adjacent the valve gate and an arm coupled to the valve gate for directing the releasing. The aggregate delivery unit may further comprise a conveyor belt of the mobile chassis for receiving the aggregate from the releasing. The aggregate delivery unit may further comprise a discharge assembly of the mobile chassis, the discharge assembly comprising an extension belt originating adjacent the conveyor belt for receiving the aggregate therefrom. The discharge assembly may comprise a pivot hinge to allow lateral pivotal angling relative to a main body of the mobile chassis.

In an embodiment, a method of controlling a wellbore operation at a well comprises advancing a conveyor toward the well, directing aggregate to the conveyor through a valve gate coupled to a aggregate container thereabove, and monitoring aggregate level in the container during the directing in substantially real-time. Alternatively, the monitoring comprises acquiring weight measurement data from a weight measurement device coupled to the container. The weight measurement device may comprise a plurality of load cells and the weight measurement data may comprise a plurality of weight measurement data, the monitoring further comprising averaging the plurality of the weight measurement data to reflect the aggregate level. Alternatively, the method further comprises adjusting a rate of the directing based on the monitoring. Alternatively, the method further comprises combining the aggregate with a liquid to form a treatment fluid and directing the treatment fluid into a wellbore to treat a subterranean formation.

In an embodiment, a method of controlling a well treatment operation at a wellsite location comprises positioning a mobile chassis at the wellsite location, advancing a conveyor of the chassis below a aggregate container on the mobile chassis, directing aggregate to the conveyor through a valve gate coupled to the aggregate container, and monitoring aggregate level in the aggregate container during the directing in substantially real-time. Alternatively, the method further comprises filling the aggregate container with the aggregate at the oilfield after the positioning. Alternatively, the method further comprises delivering the aggregate container to the mobile chassis in a pre-filled state after the positioning. Alternatively, the aggregate container may comprise a first aggregate container, the method further comprising replacing the first aggregate container with a second aggregate container in a pre-filled state. The aggregate container may comprise a first aggregate container vertically stacked with a second aggregate container. Alternatively, monitoring comprises monitoring with a feedback control system, the feedback control system receiving control signals from at least the aggregate container and the conveyor.

In an embodiment, a modular aggregate delivery assembly for a fracturing operation at an oilfield comprises a mobile chassis, and a plurality of interchangeable modular containers coupled to the mobile chassis for housing aggregate for the fracturing operation. Alternatively, each of the interchangeable containers of the plurality is separated by a distance from an adjacent interchangeable modular container. Alternatively, the assembly further comprises a plurality of weight measurement devices coupled to the plurality of interchangeable modular containers to independently monitor aggregate levels therein in substantially real-time. At least one of the plurality of interchangeable modular containers may comprise a sealable hinged door on an upper portion thereof.

In an embodiment, a modular container for housing aggregate comprises a body having a lower portion for positioning on a mobile chassis and an upper portion, and a fill port for filling the container with aggregate, the fill port coupled to the body through one of the upper portion and the lower portion. Alternatively, the body is a rotationally molded structure. Alternatively, the lower portion has an opening for communication with a valve gate of a cradle adjacent the container, the valve gate for controllably releasing aggregate from the container. Alternatively, the aggregate is one of proppant, cement, a plastic, fertilizer, feed, a liquid chemical, rock salt, benzoic acid, a fiber material, and mixtures thereof. The modular container may further comprise a substantially inaccessible upper portion, a wear plate coupled to the body at an interior of the upper portion, and a lift pipe coupled to the fill port and having an exit adjacent the wear plate for directing the aggregate thereat during filling of the modular container with the aggregate.

A wireless control device is provided for controlling and monitoring the proppant delivery aspects of a hydraulic fracturing operation at an oilfield. The device includes a wireless transceiver coupled to a mobile body. A plurality of actuation levers are also coupled to the mobile body for directing release of proppant from interchangeable modular containers at the oilfield.

DETAILED DESCRIPTION

Embodiments are described with reference to certain aggregate delivery units for delivering proppant to a well at an oilfield during a fracturing operation. However, other types of aggregate may be accommodated by the units for a host of different industrial applications. For example, embodiments of aggregate delivery units described herein may be used in a variety of operations to store and deliver a host of other types of aggregates such as, but not limited to, cement, plastics, fertilizer, feed, and other agricultural products. Regardless, the aggregate delivery unit includes a modular container for housing the aggregate and/or means for monitoring delivery of the aggregate in substantially real-time during an operation.

Figure 1:
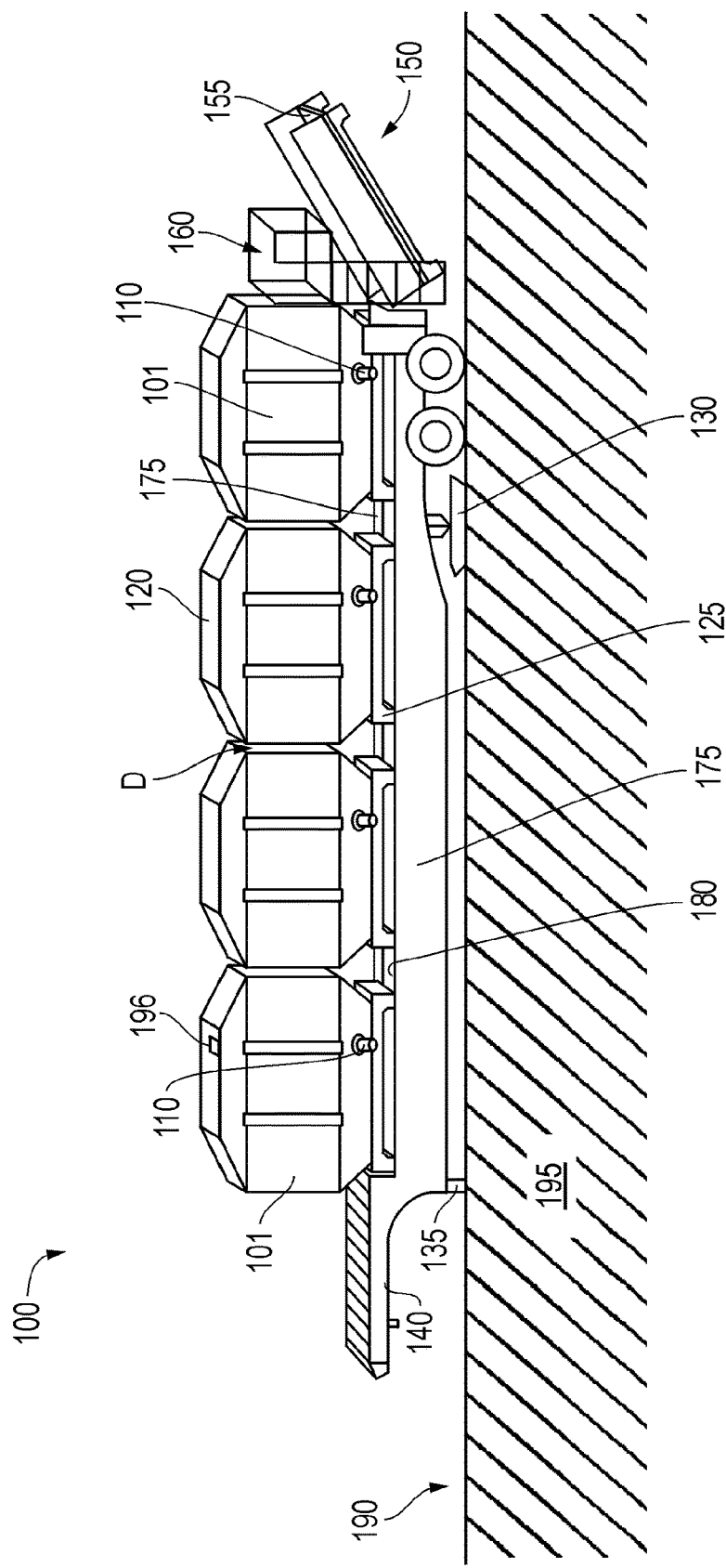
FIG. 1 is a side perspective view of an embodiment of an aggregate delivery unit at an oilfield.

Referring now to FIG. 1, a perspective view of an aggregate delivery unit 100 is depicted at an oilfield or wellsite location 190. The aggregate delivery unit 100 may have, but is not limited to, a capacity of 2,000-6,000 cubic feet provided by modular containers 101 accommodated at a mobile chassis 175. The mobile chassis 175 may be a trailer of high strength material configured to accommodate the modular containers 101 and their weight when filled as described further below. The mobile chassis 175 may be a skid or similar chassis that may be transported to the wellsite location 190, as will be appreciated by those skilled in the art. Additionally, the chassis 175 is constructed for use on roadways and includes an extension 140 for securing at a hitch of a truck suitable for hauling the mobile chassis 175 to the oilfield 190 as depicted.

In an embodiment, the chassis 175 is configured to accommodate substantially empty modular containers 101 during transport to the oilfield or wellsite location 190. Alternatively, however, the mobile chassis 175 may be positioned at the oilfield 190 with the modular containers 101 later positioned thereon as depicted. Indeed, in an embodiment, the modular containers 101 are employed for transporting aggregate 300, and may be positioned on the chassis 175 "pre-filled" with an aggregate 300 such as proppant for use in an oilfield application as detailed further below (see FIG. 4).

Figure 4:
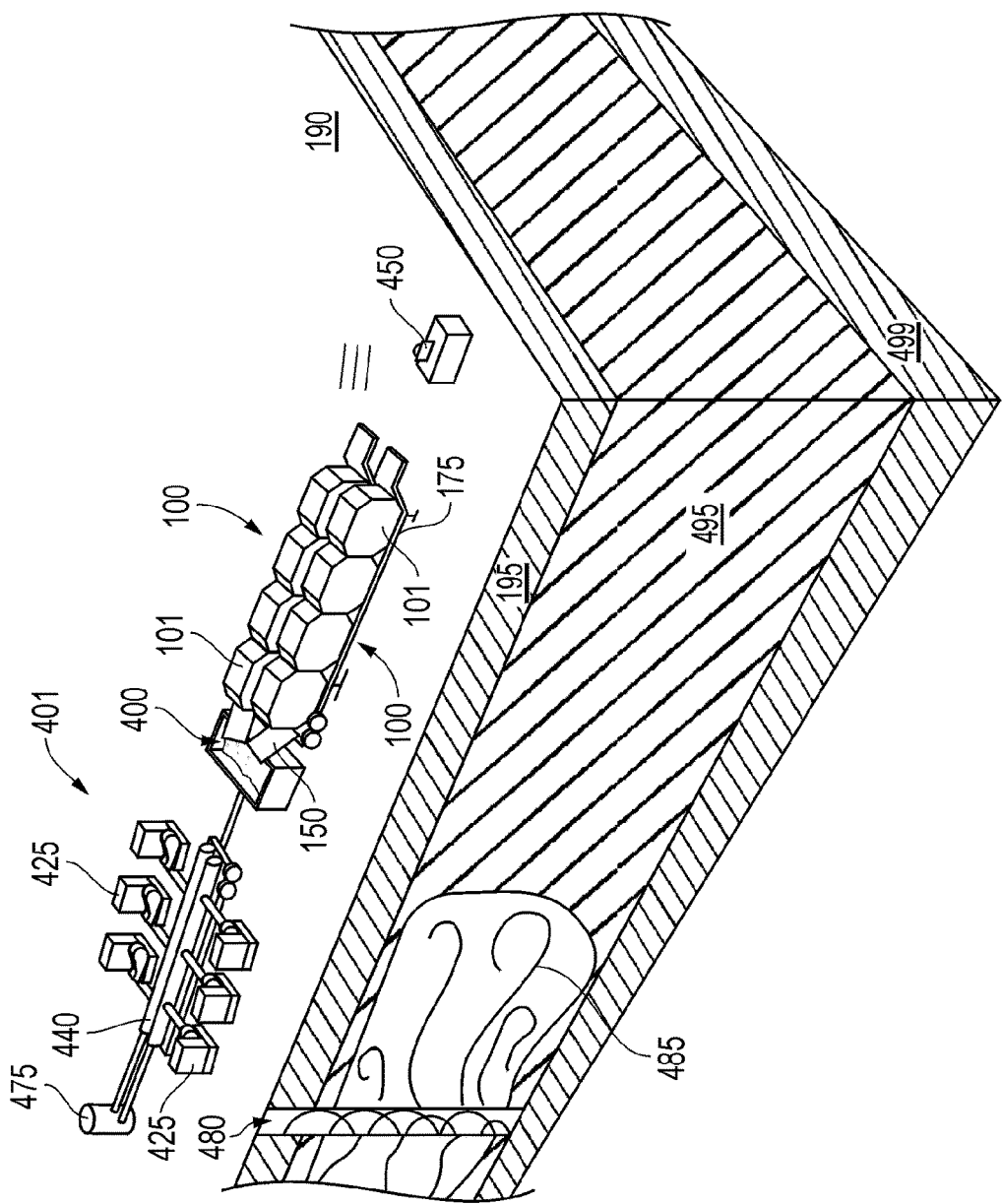
FIG. 4 is a perspective overview of a fracturing operation at the oilfield of FIG. 1 employing multiple aggregate delivery units.

Continuing with reference to FIG. 1, with added reference to FIG. 4, the aggregate delivery unit 100 may be stabilized in position at the oilfield or wellsite location 190 with front 135 and rear stabilizers 130. In one embodiment, the front stabilizers 130 may be hydraulically actuated to raise and lower the noted extension 140 for hitching and un-hitching from a truck. Furthermore, the unit 100 includes a conveyor belt 180 running below the modular containers 101. As detailed herein, once positioned, the conveyor belt 180 and a discharge assembly 150 may be employed to direct aggregate 300 from the modular containers 101 to a formation 195 at the oilfield 190 for an operation thereat, as will be further described herein. In the embodiment shown, the discharge assembly 150 is configured to remain substantially vertical during transport of the chassis 175 to the oilfield 190. However, the aggregate delivery unit 100 is equipped with a platform 160 to allow an operator to direct the discharge assembly 150 and an extension belt 155 thereof to a more diagonal position. In this manner, the extension belt 155 may be oriented for advancing and dropping of aggregate 300 into a mixer 400 for the operation.

As indicated above, the mobile chassis 175 may be configured to accommodate substantially empty modular containers 101 during transport to the oilfield or wellsite location 190. As such, each modular container 101 may be equipped with a fill port 110 for filling the containers 101 with aggregate 300 as detailed with respect to FIG. 3 below. Of note, is the fact that in the embodiment shown, the fill port 110 is located at a lower portion of each modular container 101 whereas the upper portion of each container 101 is substantially inaccessible, particularly at the top 120. In this manner, an operator of the aggregate delivery unit 100 may be discouraged from climbing up to the upper portion of the containers 101. That is, without a removable lid, or visual or actual access to the interior of the containers 101 at the upper portions thereof, the operator may have no reason to climb up to the upper portions of the containers 101.

Continuing with reference to FIG. 1, the mobile chassis 175 is equipped with a cradle 125 for each of the modular containers 101 to be accommodated. Each cradle 125 may be of configured to securely immobilize each modular container 101 in place, whether for transport as described above, or during an operation as detailed with respect to FIG. 4 below. Furthermore, each cradle 125 may be positioned so as to ensure a distance (D) is present between the containers once secured at the chassis 175. In this manner, each modular container 101 may remain physically unaffected by neighboring containers 101. As such, the containers 101 may be independently and accurately monitored during an operation. For example, in one embodiment, at least one weight measurement device is incorporated into each cradle 125 for independent monitoring of aggregate levels within each container 101.

Figure 2:
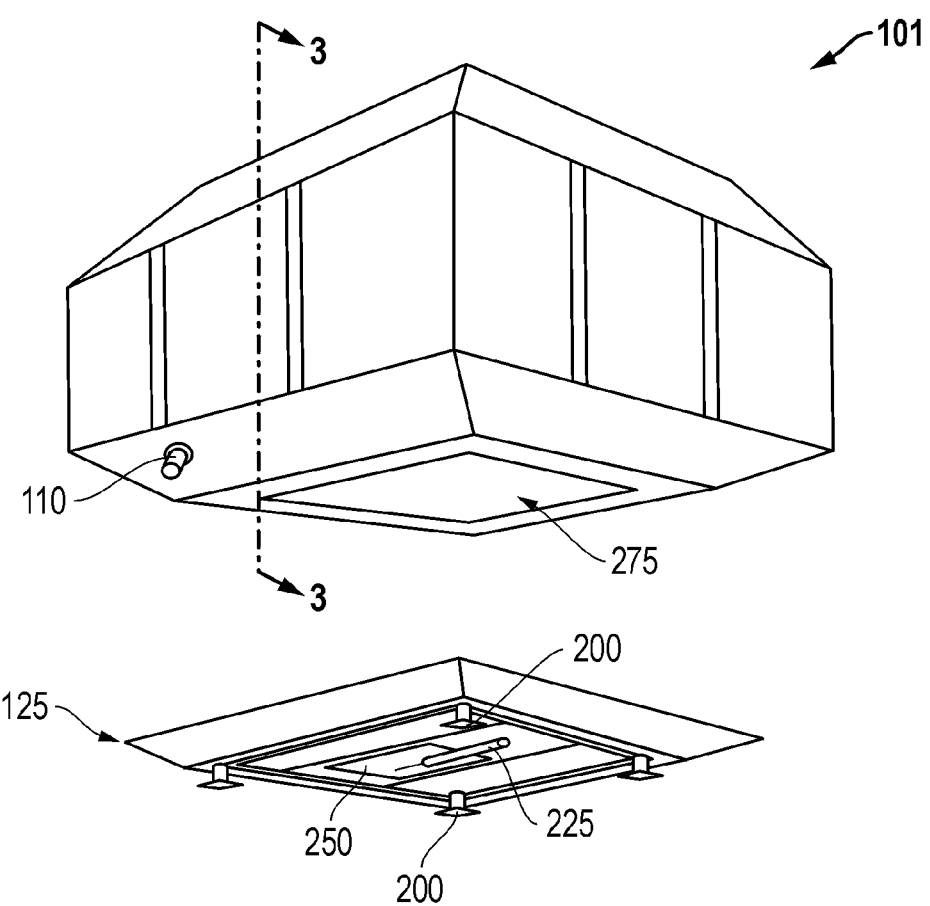
FIG. 2 is an exploded view of an embodiment of a modular container and cradle of the aggregate delivery unit of FIG. 1.

Referring now to FIG. 2, an exploded perspective view of a modular container 101 with underlying cradle 125 is depicted. In the embodiment shown, the cradle 125 is equipped with a weight measurement device in the form of load cells 200 distributed about the underside of the cradle 125. That is, the load cells 200 may be disposed between the body of the cradle 125 and the chassis 175 of the aggregate delivery unit 100 of FIG. 1. In this manner, data obtained from the load cells 200 may be acquired throughout an operation in order to dynamically monitor the changing weight of the modular container 101. Preferably, the load cells 200 are removably disposed between the cradle 125 and the chassis 175 of the aggregate delivery unit 100 for ease of maintenance, as will be appreciated by those skilled in the art.

Figure 3:
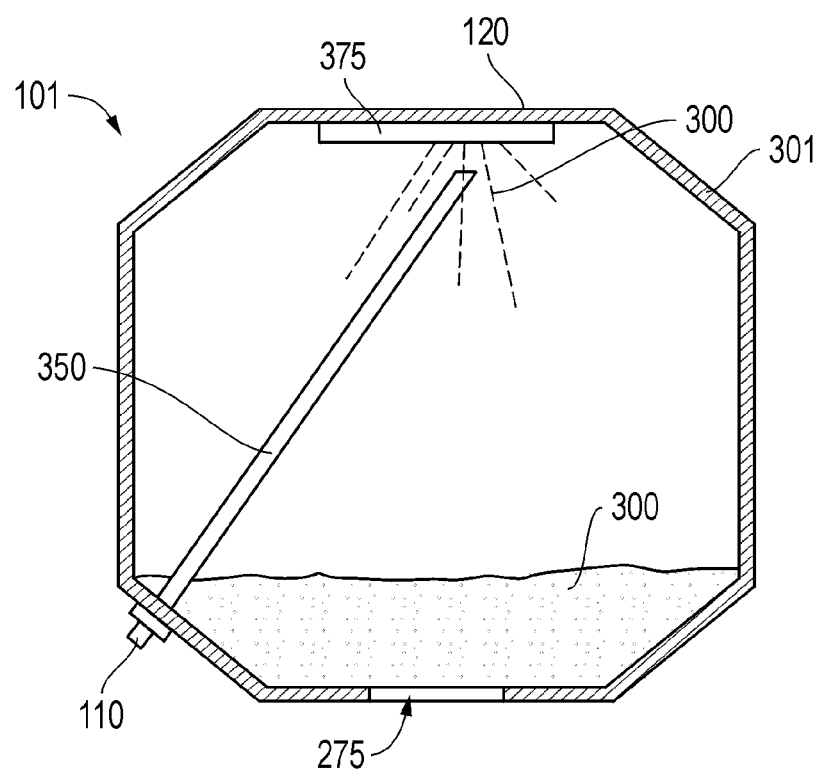
FIG. 3 is a side cross-sectional view of the modular container of FIG. 2 being filled with aggregate.

In the embodiment of FIG. 2, the load cells 200 are strain gauge based. However other types of load cells 200 may be employed, as will be appreciated by those skilled in the art. Additionally, in FIG. 2 the load cells 200 are preferably located at each of four corners of the underside of the frame of the cradle 125. As such, data obtained from the load cells 200 may be averaged out dynamically in order to improve metering accuracy of the changing weight of the modular container 101 during an operation. That is, aggregate 300 at the interior of the container 101, as depicted in FIG. 3, may be unevenly distributed. Nevertheless, positioning of a variety of load cells 200 at distinct locations adjacent the cradle 125 as depicted allows for averaging of the attained weight data. In this manner, aggregate metering accuracy may be substantially enhanced.

Continuing with reference to FIG. 2, a perspective view of the modular container 101 is depicted. In one embodiment, the container 101 is formed by conventional rotational molding and finishing techniques. In such an embodiment, the container 101 may be of a conventional durable plastic polymer such as cross-linked polyethylene. However, other material types may also be employed. Construction of a modular container 101 in this manner substantially reduces manufacturing expenses in terms of the amount of labor and foot-space required as compared to a conventional metal container requiring significant welding and large manufacturing area.

In the embodiment shown, the modular container 101 is formed and finished with a fill port 110 and an opening 275, both located at the lower portion of the container 101. However, the remainder of the container 101, particularly at the upper portion, preferably remains inaccessible for ether manual access or for visual inspection of the interior. As such, an operator may be discouraged from climbing to the top 120 of the container 101 (see FIG. 1).

As indicated above, the modular container 101 may be rotationally molded and finished with an opening 275 left at the underside thereof. As such, the opening 275 may be of a predetermined size and formed during the molding and finishing assembly process. In the embodiment shown, the entire underside of the modular container 101 is configured to be accommodated by the underlying cradle 125. Therefore, the opening 275 may cover a majority of the underside of the container 101. That is, as described below for the depicted embodiment, the cradle 125 is equipped to secure and seal the underside of the container 101. Thus, the opening 275 may approach the size of the underside of the container 101.

With added reference to FIGS. 1 and 3, the opening 275 is located above a valve gate 250 of the cradle 125. The valve gate 250 may be hydraulically actuated by a hydraulic arm 225 as depicted. In this manner, aggregate 300 within the modular container may be controllably released onto the conveyor belt 180 therebelow for an application such as hydraulic fracturing as detailed below. In one embodiment, the opening and closing of the valve gate 250 via the hydraulic arm 225 is remotely directed and monitored to accurately control the metering of aggregate 300 to the conveyor belt 180. Indeed, such data may be combined with data obtained from the above noted weight measurement device (e.g. load cells 200) in order to further enhance accuracy of aggregate delivery.

Referring now to FIG. 3, a side cross-sectional view of the modular container 101 is depicted as it is partially filled with aggregate 300. In the embodiment shown, the container 101 may accommodate about 1,000 cubic feet of aggregate 300. Additionally, the aggregate 300 may be a conventional proppant for a hydraulic fracturing application as depicted in FIG. 4. As such, the aggregate 300 may be sand, glass beads, ceramic material, bauxite, dry powders including polymers and/or fluid loss additives, rock salt, benzoic acid, fiber material, or mixtures thereof, as will be appreciated by those skilled in the art. Thus, when filled to near-capacity, the container 101 may accommodate up to 100,000 lbs. or more of proppant. However, as indicated above, the aggregate delivery unit 100 of FIG. 1 may be employed for other industrial applications. Therefore, in other embodiments, the aggregate 300 may be cement, plastics, fertilizer, feed or a variety of other industrial products and/or aggregates. In an embodiment, each of the modular containers 101 may be filled with a different type of aggregate.

In one embodiment, the industrial aggregate 300 may even be in liquid form. Furthermore, with added reference to FIG. 1, the modular container 101 may be configured as a "half-mod" of roughly half the width of the surrounding containers 101. That is, two "half-mod" containers together may occupy the same area or footprint on the chassis 175 as a single modular container 101. Such a 'half-mod' embodiment may be particularly well-suited for containing a liquid chemical or chemicals. Alternatively, the modular container 101 may be configured as roughly half the height of the height of the container. Such "half-height" containers may be advantageously vertically stacked and store the same or different materials and/or may be configured (i.e., such as by altering the upper portion of the "half-height containers" by including a sealable hinged door or similar configuration on an upper portion of the container) such that the aggregate in the upper container flows into the lower container, as will be appreciated by those skilled in the art.

Continuing with reference to FIG. 3, with added reference to FIG. 1, the aggregate 300 is pneumatically fed into the modular container 101 by conventional means, through the fill port 110. As described above, filling of the container 101 as depicted may occur once it is positioned at the oilfield or wellsite location 190. Alternatively, the modular container 101 may be employed to transport the aggregate 300 to the mobile chassis 175 at the oilfield 190.

Once in the container 101, the aggregate 300 is dispensed through a lift pipe 350 toward the top 120 of the container 101 as depicted in FIG. 3. In this manner, the fill port 110 may be located at a lower portion of the container 101 for operator convenience. That is, filling may proceed without concern over occlusion of the port 110 by the rising level of the aggregate 300. Additionally, a wear plate 375 of durable metal or other suitable material is secured to the body 301 of the modular container 101, adjacent the exit of the lift pipe 350. In this manner, filling of the container 101 with aggregate 300 may proceed without concern over damage to the container body 301. For example, filling the container 101 with an abrasive proppant for a fracturing application may proceed without damage to the polyethylene body 301. Rather, the wear plate 375 is provided to deflect incoming proppant toward the interior of the container 101. As in the embodiment shown, the wear plate 375 will generally be secured to the underside of the top 120 of the modular container 101. However, other positioning may be possible, depending on the particular orientation and configuration of the container 101 and the lift pipe 350 relative to one another.

Referring now to FIG. 4, with added reference to FIG. 3, an embodiment of a fracturing operation employing multiple aggregate delivery units 100 at the oilfield or wellsite location 190 is depicted. The units 100 may be positioned at the oilfield 190 as shown, with the modular containers 101 empty. Subsequently, the containers may be filled on-site with aggregate 300. In this manner, sufficient aggregate supply, control, and other delivery advantages of the units 100 may be taken advantage of during the fracturing operation. Alternatively, the modular container or containers 101 may be configured to be filled from an upper portion of the container 101, such as with a sealable hinged door 196 or similar configuration. In this manner, the container may be advantageously filled with aggregate 300 by gravity. Filling the container or containers 101 by gravity may also prevent damage to the quality of the aggregate 300 during transport and contact with the wear plate 375 or the like.

In an embodiment, the mobile chassis 175 of the aggregate delivery units 100 may initially be positioned at the oilfield 190 without the modular containers 101. A winch truck or other means may then be employed to position the pre-filled containers 101 to the mobile chassis 175. That is, the containers 101 may serve as part of a transport assembly for the aggregate 300. Where such aggregate transport is employed, the interchangeable nature of the modular containers 101 may be further appreciated. For example, in one embodiment, a modular container 101 may be emptied or found to be of undesirable aggregate 300 and thus, removed from the chassis 175 and replaced with another pre-filled container 101 without requiring stoppage of the fracturing operation.

In the operation depicted, the aggregate delivery units 100 are positioned immediately adjacent one another so as to minimize the amount of area or footprint required at the oilfield or wellsite location 190. Thus, in the embodiment shown, the discharge assemblies 150 at the rear of each unit 100 are equipped with a pivot hinge. This allows pivotal angling of the assemblies 150 toward one another in a lateral manner (relative to the main body of the chassis). As such, aggregate 300 from the containers 101 may be directed to a central location of a mixer 400 of a mixing system 401 between the units 100.

Liquid and other constituents may also be added to the mixer 400 to form a treatment or fracturing fluid 485, typically in the form of a slurry. Once a sufficient supply of fracturing fluid or slurry 485 is assured, the fracturing operation may proceed with fluid 485 directed to a manifold 440 and pressurized by a host of positive displacement pumps 425. Depending on the parameters of the operation, between about 1,000 and about 20,000 psi may be generated by the pumps 425 and directed through a well head 475 into a well 480 to treat the formation 495. The well 480 may traverse various formation layers 195, 495, 499. In particular, a fracturable formation layer 495 may be cracked by the fracturing fluid 485 as a means of promoting hydrocarbon recovery therefrom.

Throughout the above-described fracturing operation, aggregate levels within the modular containers 101 may be accurately monitored in real-time. Furthermore, an enhanced degree of precision may be afforded to aggregate addition to the mixer 400. For example, as indicated above, real-time data regarding the weight of each container 101 may be acquired providing dynamic information as to aggregate levels within the containers 101. This data may be used in conjunction with data related to the directing and monitoring of valve gate 250 positioning as described above so as to achieve enhanced accuracy in delivering of aggregate 300 to the operation (see FIGS. 2, 3). In the embodiment shown, all of this data may be acquired and employed for directing aggregate delivery from a preferably wireless control device 450. Of note, is the fact that the wireless control device 450 may be positioned remotely from the aggregate delivery units 100 during the operation. Thus, the operator may remotely direct the aggregate delivery portion of the fracturing operation while being removed from the proximity of debris near the units 100.

Figure 5:
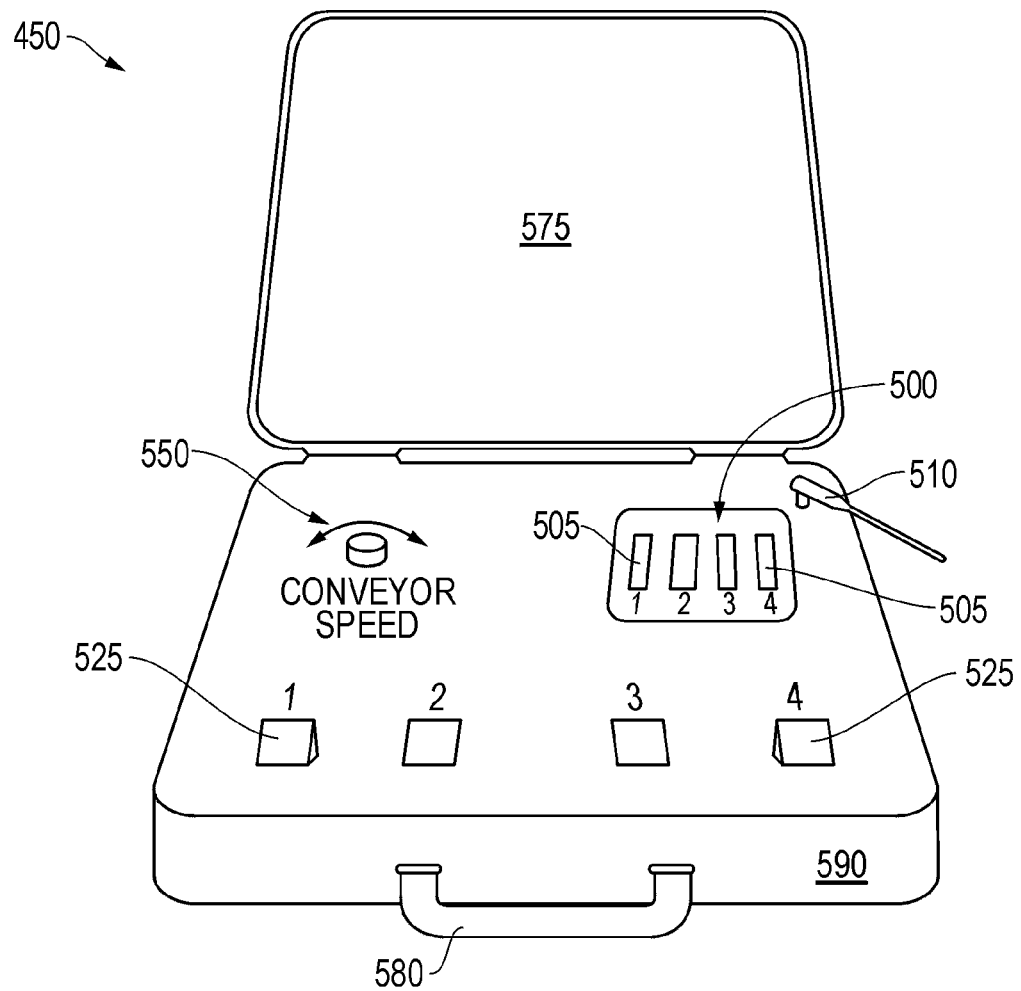
FIG. 5 is a front perspective view of a wireless control device for directing the aggregate delivery units for the operation of FIG. 4.

With added reference to FIG. 5, a perspective view of the above-noted wireless control device 450 is depicted. The device 450 is in the form of a convenient carrying case of durable plastic or other suitable material. As shown, the device 450 is replete with a user-friendly handle 580 secured to an equipment base 590 with a lid 575 which may be opened to reveal displays and actuators relative to aggregate delivery for the fracturing operation. In the embodiment shown, the device 450 includes a wireless transceiver 510 for communication with the aggregate delivery units 100. In particular, communication between the wireless control device 450 and the load cells 200 as well as sensors at the valve gates 250 (indicating, for example the percentage that the valve gate 250 is open) is provided (see FIG. 2). As such, a display 500 may be provided at the device 450 to provide a visual of real-time aggregate levels 505 within individual modular containers 101 of a unit 100. In the embodiment of FIG. 5, a single aggregate delivery unit 100 is being monitored and directed with the device 450. However, in other embodiments multiple units 100 may be monitored and directed with a single wireless control device 450.

In addition to a visual of aggregate levels 505 at the display 500, actuation levers 525 for wirelessly controlling positioning of valve gates 250 via conventional means through the transceiver 510 are provided (see FIG. 2). Thus, aggregate delivery rates from the individual modular containers 101 may be wirelessly directed in real-time. Similarly, an actuation knob 550 for controlling the speed of the conveyor 180 and discharge 155 belts through the transceiver 510 via conventional means is also provided (see FIG. 1). Thus, the operator may be in control of virtually all aspects of aggregate delivery during the fracturing operation from a remote location.

Figure 6:
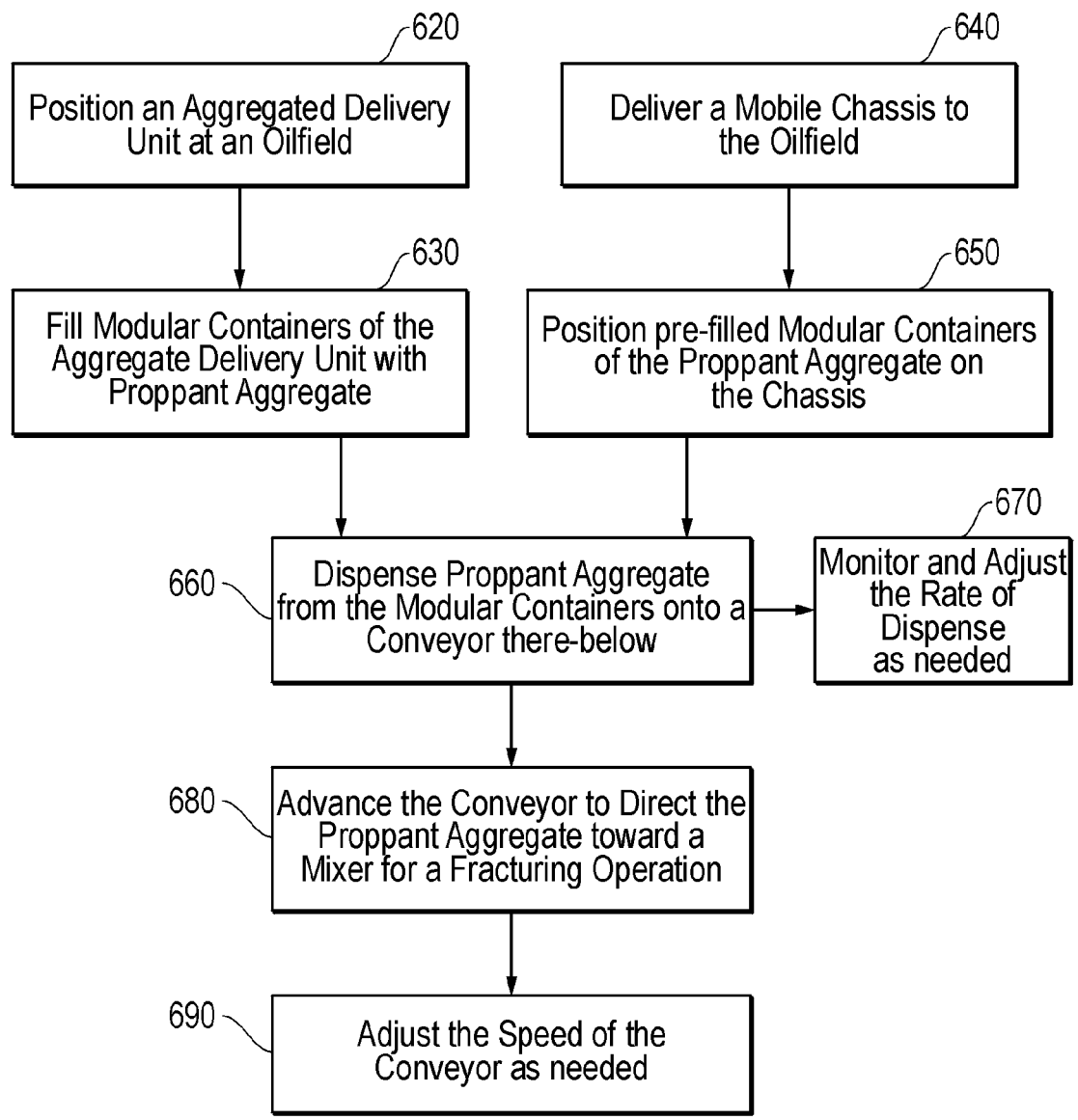
FIG. 6 is a flow-chart summarizing an embodiment of a fracturing operation at an oilfield employing at least one aggregate delivery unit.

Referring now to FIG. 6, a flow-chart summarizing an embodiment of a fracturing operation employing an aggregate delivery unit as detailed above is described. As indicated at 620 and 630, in an embodiment, the entire aggregate delivery unit may be provided to the oilfield where modular containers are then filled with proppant aggregate for the fracturing operation. Alternatively, as indicated at 640 and 650, a mobile chassis of the delivery unit may be delivered to the oilfield followed by positioning of "pre-filled" modular containers of the proppant aggregate.

Once a proppant-filled aggregate delivery unit is available at the oilfield or wellsite location, the proppant aggregate may be dispensed in a controlled manner onto a conveyor running below the modular containers as indicated at 660. As detailed hereinabove and indicated at 670, the rate of dispensing of the proppant may be monitored and adjusted in real-time, for example with a wireless control device. Furthermore, as indicated at 680 and 690, advance of the proppant toward a well, such as the well head 475, a fracturing operation may be similarly adjusted in real-time. Such adjustments to the proppant dispense rate or the conveyor speed may be based on the availability of real-time data and feedback from a weight measurement device and sensors at the hydraulic valve gates below the modular containers. Furthermore, this real-time control and accuracy over proppant delivery afforded the operator helps avoid overfill and waste of proppant during the operation, in addition to the host of other advantages noted above.

The aggregate delivery units 100 may advantageously reduce the number of times aggregate 300 has to be loaded and offloaded, which may result in maintaining better quality of aggregate (i.e., fewer contamination possibilities) and a reduction in the potential percentage loss of the aggregate 300. The modular containers 101 of the aggregate delivery units 100 may be pre-loaded into the modular, mobile compartments and transported to location, which may increase the efficiency of the operation of the units 100.

Figure 7:
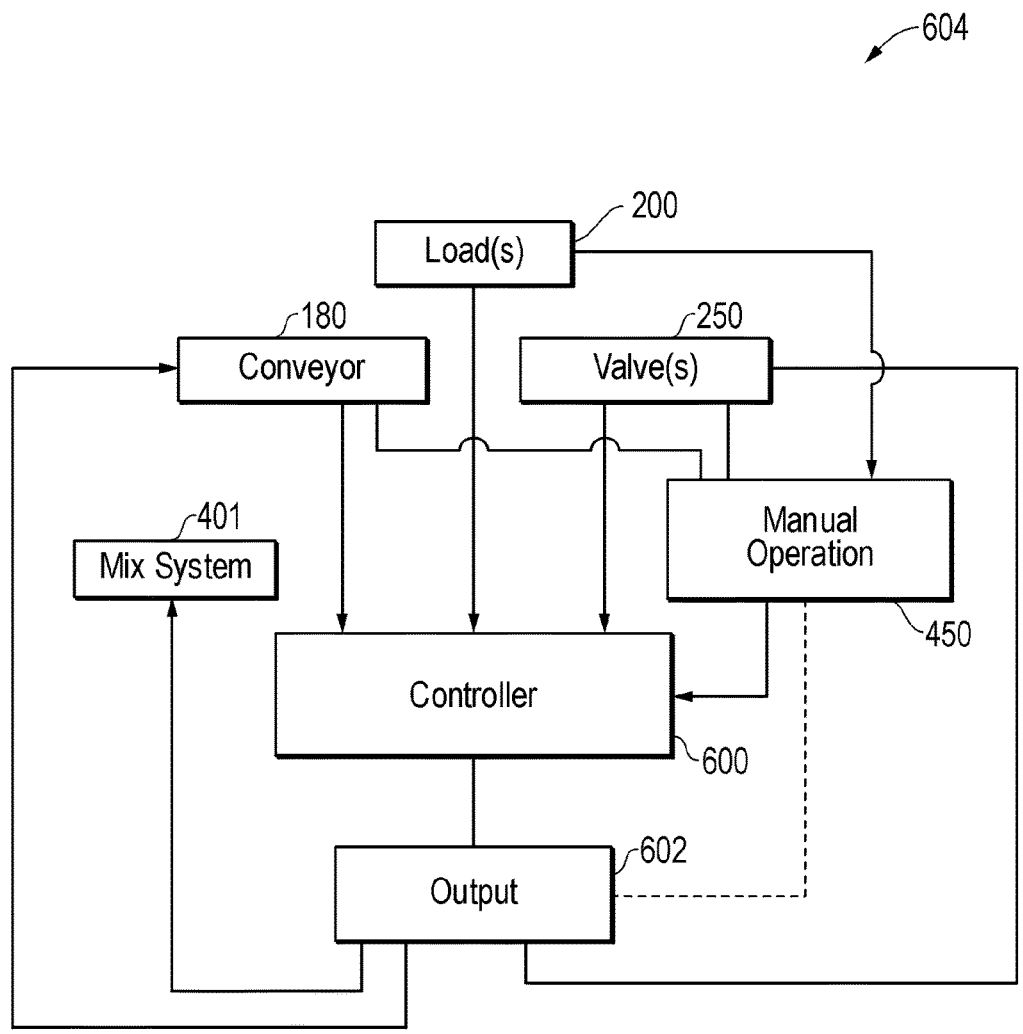
FIG. 7 is a block diagram of an embodiment of a control system for the aggregate delivery unit of FIGS. 1-6.

Referring now to FIG. 7, the device 450 or a similar device may be connected to a controller 600, such as a microprocessor or the like, for controlling the operation of the aggregate delivery unit 100 with a feedback-loop control system 604 based on the various signals received by the device 450 or controller 600. The controller 600 may receive inputs from such as, but not limited to, the speed of the conveyor 180, the percentage open of the valve gates 250 and the signals from the load cells 200, which may enable the generation of an output 602 such as, but not limited to, a chart, process control diagram, or the like showing the rate of aggregate flowing out of the container and onto the conveyor belt 180 based on the type of aggregate in the container(s) 101, the level of aggregate in the container(s) 101 and the gate 250 position, which may further provide feedback signals including the percentage the gate 250 should be open based on the conveyor 180 belt speed to achieve the desired aggregate delivery rate output, as well as make adjustments to the conveyor speed 180, the gate 250 opening percentages and the like. Furthermore, based on an overall treatment design it would be possible to predetermine the way in which the unit 100 should be unloaded in order to pump the aggregate 300 as per the treatment design. The display 500 may further comprise a desired aggregate rate display on the panel in order to manually provide signals to the controller 600, to set the rate or to receive the desired aggregate rate automatically from other equipment 606, such as the mixing system 401, the pumps 425 or the like, as will be appreciated by those skilled in the art. The inputs 180, 200, 250, and 401 and outputs 602 may be communicated via a wired connection or a wireless connection.

Embodiments described above allow for remote monitoring of aggregate levels within a delivery unit during an application employing the aggregate. Furthermore, the operation itself may be monitored and directed from a relatively remote location for the safety of the operator. Additionally, real-time monitoring and enhanced accuracy of aggregate delivery may be achieved during the operation. Once more, these advantages may be achieved with an aggregate delivery unit requiring less area and labor to manufacture as compared to a conventional metal-based delivery unit.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, embodiments described herein include aggregate delivery units which employ modular containers each containing a particular aggregate type. However, in other embodiments, the containers themselves may be partitioned so as to accommodate multiple types of aggregate in a relatively isolated manner relative to one another within the same container. Furthermore, the foregoing description should not be read as pertaining only to the precise structures described and shown in the accompanying drawings, but rather should be read as consistent with and as support for the following claims, which are to have their fullest and fairest scope.

We claim:

1. An aggregate delivery unit comprising:
   a modular container for housing aggregate, the modular container having a body with a lower portion and an upper portion;
   a mobile chassis for accommodating said modular container; and
   a cradle having a frame to accommodate said modular container thereon and coupled to at least one weight measurement device, the at least one weight measuring device disposed between said mobile chassis and said cradle, the cradle comprising a valve gate for controllably releasing aggregate within said modular container through an opening adjacent said valve gate,
   the modular container comprising: a fill port for filling the modular container with aggregate, the fill port being coupled to the body through the lower portion; and an opening at an upper portion of the modular container for filling the modular container with the aggregate in conjunction with or alternatively to the fill port.

2. The aggregate delivery unit of claim 1 wherein said at least one weight measurement device is a plurality of load cells about the frame of said cradle, the plurality to provide weight measurement data for averaging.

3. The aggregate delivery unity of claim 1 wherein said cradle further comprises:
   an arm coupled to said valve gate for directing the releasing.

4. The aggregate delivery unit of claim 3 further comprising a conveyor belt of said mobile chassis for receiving the aggregate from the releasing.

5. The aggregate delivery unity of claim 4 further comprising a discharge assembly of said mobile chassis, said discharge assembly comprising an extension belt originating adjacent said conveyor belt for receiving the aggregate therefrom.

6. The aggregate delivery unit of claim 5 wherein said discharge assembly comprises a pivot hinge to allow lateral pivotal angling relative to a main body of said mobile chassis.

7. The aggregate delivery unit of claim 5 wherein further comprising a controller in communication with the at least one weight measuring device, the valve gate, the conveyor belt, and the extension belt for controlling the operation of the aggregate delivery unit.

8. A modular aggregate delivery assembly for a fracturing operation at an oilfield, the assembly comprising:
   a mobile chassis;
   a plurality of interchangeable modular containers independently coupled to said mobile chassis for housing aggregate for the fracturing operation, each interchangeable modular container having a body to receive aggregate, the aggregate being directed into the body through a fill port located in a lower portion of the body; and
   a plurality of weight measurement devices coupled to said plurality of interchangeable modular containers to independently monitor aggregate levels therein in substantially real-time, wherein the weight measurement devices are removably disposed between the mobile chassis and the modular containers.

9. The modular aggregate delivery assembly of claim 8 wherein each of the interchangeable containers of said plurality is separated by a distance from an adjacent interchangeable modular container.

10. The modular aggregate delivery assembly of claim 8 wherein at least one of said plurality of interchangeable modular containers comprises a sealable hinged door on an upper portion thereof.

11. The modular aggregate delivery assembly of claim 8 further comprising a discharge assembly comprising a conveyor belt for receiving a discharge of the aggregate from the modular containers, an extension belt originating adjacent said conveyor belt for receiving the aggregate therefrom and directing the aggregate to a mixer and at least one pump for the fracturing operation, and a feedback loop control system in communication with the weight measurement devices, the conveyor belt, the extension belt, the mixer, and the pump for controlling the fracturing operation.

12. A modular container for housing aggregate, the modular container comprising:
    a body having a lower portion for positioning on a mobile chassis and an upper portion, wherein the lower portion of the body has an opening for communication with a valve gate of a cradle adjacent the container, the valve gate of the cradle configured to controllably release aggregate from the container; and
    a fill port for filling the container with aggregate, said fill port coupled to said body through the lower portion; and
    an opening at an upper portion of the container for filling the container with aggregate in conjunction with or alternatively to the fill port.

13. The modular container of claim 12 wherein said body is a rotationally molded structure.

14. The modular container of claim 12 wherein the aggregate is one of proppant, cement, a plastic, fertilizer, feed, a liquid chemical, rock salt, benzoic acid, a fiber material, and mixtures thereof.

15. The modular container of claim 12 further comprising:
    a wear plate coupled to said body at an interior of the upper portion; and
    a lift pipe coupled to said fill port and having an exit adjacent said wear plate for directing the aggregate thereat during filling of the modular container with the aggregate.

16. The modular container of claim 12 further comprising at least one weight measurement device to monitor aggregate levels in the container and a controller in communication with the valve gate and the weight measurement device for controlling a level of the container during operation thereof.

* * * * *